(12) United States Patent
Cohrs et al.

(10) Patent No.: US 8,123,930 B2
(45) Date of Patent: *Feb. 28, 2012

(54) ADDITIVES FOR CRUDE OILS

(75) Inventors: Carsten Cohrs, Burghausen (DE);
Matthias Krull, Harxheim (DE);
Michael Feustel, Koengernheim (DE);
Heidi Rausch, Garching/Alz (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 414 days.

This patent is subject to a terminal disclaimer.

(21) Appl. No.: 11/525,881

(22) Filed: Sep. 22, 2006

(65) Prior Publication Data

US 2007/0221539 A1 Sep. 27, 2007

(30) Foreign Application Priority Data

Sep. 22, 2005 (DE) .......... 10 2005 045 133

(51) Int. Cl.
*C10G 71/00* (2006.01)
(52) U.S. Cl. .......... 208/18; 526/312; 44/440
(58) Field of Classification Search ............ 44/440; 526/312; 208/18
See application file for complete search history.

(56) References Cited

U.S. PATENT DOCUMENTS

| | | | |
|---|---|---|---|
| 2,499,368 A | 3/1950 | Degroote | |
| 4,147,854 A * | 4/1979 | Skillicorn | 526/312 |
| 4,211,534 A | 7/1980 | Feldman | |
| 4,537,701 A | 8/1985 | Oppenlaender et al. | |
| 4,670,516 A | 6/1987 | Sackmann | |
| 5,021,498 A | 6/1991 | Stephenson | |
| 5,039,437 A | 8/1991 | Martella | |
| 5,089,589 A | 2/1992 | Hesse | |
| 5,186,720 A | 2/1993 | Feustel | |
| 5,391,632 A | 2/1995 | Krull | |
| 5,707,946 A | 1/1998 | Hiebert | |
| 5,766,273 A | 6/1998 | Dralle-Voss | |
| 5,998,530 A | 12/1999 | Krull | |
| 6,120,678 A | 9/2000 | Stephenson et al. | |
| 6,180,683 B1 | 1/2001 | Miller et al. | |
| 6,232,277 B1 | 5/2001 | Ledeore | |
| 6,248,142 B1 * | 6/2001 | Caprotti | 44/440 |
| 6,258,135 B1 * | 7/2001 | Caprotti et al. | 44/389 |
| 6,465,528 B1 | 10/2002 | Holtrup et al. | |
| 6,821,933 B2 | 11/2004 | Feustal et al. | |
| 2003/0171221 A1 | 9/2003 | Feustal et al. | |
| 2004/0010072 A1 | 1/2004 | Krull | |
| 2004/0050752 A1 | 3/2004 | Leinweber et al. | |
| 2005/0000151 A1 | 1/2005 | Jackson | |

FOREIGN PATENT DOCUMENTS

| | | |
|---|---|---|
| CA | 2017126 | 11/1990 |
| EP | 0381966 | 8/1990 |
| EP | 1044996 | 10/2000 |
| GB | 1167427 | * 10/1969 |
| GB | 1173975 | 12/1969 |
| GB | 2305437 | 4/1997 |
| WO | 03311452 | * 7/1988 |
| WO | WO9314178 | 7/1993 |
| WO | WO9840158 | 9/1998 |
| WO | WO0196503 | 12/2001 |
| WO | WO02064706 | 8/2002 |

OTHER PUBLICATIONS

"Kirk-Othmer Encyclopedia of Chemical Technology, Fourth Edition", 1997, vol. 21, pp. 606 and 616.
EP Search Report for Application No. EP06018635.0-1270 PCT, dated Oct. 12, 2009.

* cited by examiner

*Primary Examiner* — Michael Marcheschi
*Assistant Examiner* — Chantel Graham
(74) *Attorney, Agent, or Firm* — Tod A. Waldrop

(57) ABSTRACT

The invention thus provides crude oils and products which have been produced therefrom and comprise distillation residues, comprising at least one alkylphenol-aldehyde resin having a repeat structural unit of the formula

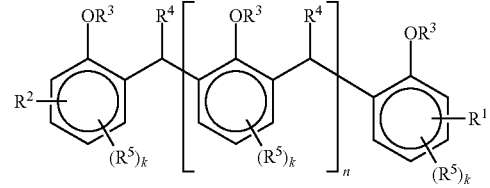

where
$R^1$ is a branched alkyl or alkenyl radical which has from 10 to 40 carbon atoms and bears at least one carboxyl, carboxylate and/or ester group,
$R^2$ is hydrogen or $R^1$
$R^3$ is hydrogen or an alkoxy group of the formula $$-(A-O)_m-H,$$

A is a $C_2$- to $C_4$-alkylene group,
m is from 1 to 100,
$R^4$ is hydrogen, a $C_1$- to $C_{11}$-alkyl radical or a carboxyl group,
$R^5$ is $C_1$-$C_{200}$-alkyl or -alkenyl, $O-R^6$ or $O-C(O)-R^6$,
$R^6$ is $C_1$-$C_{200}$-alkyl or -alkenyl,
n is from 1 to 100 and
k is 1 or 2, the use of the alkylphenol-aldehyde resin for splitting emulsions of water and crude oils or products derived therefrom, the use of the alkylphenol-aldehyde resin for improving the cold flowability of crude oils and products derived therefrom, and the use of the alkylphenol-aldehyde resin as an asphaltene dispersant in crude oils and products derived therefrom.

10 Claims, No Drawings

ADDITIVES FOR CRUDE OILS

The present invention relates to alkylphenol-aldehyde resins which contain structural units of fatty acids and derivatives thereof, and which have improved performance properties as additives for crude oils.

Crude oils are complex mixtures of different types of substances, some of which can present problems during production, transport, storage and/or further processing. For instance, freshly extracted crude oil comprises a relatively large amount of emulsified water which has to be removed before transport and storage. Some crude oils, and also products derived therefrom, for example heavy heating oil or marine diesel, comprise hydrocarbon waxes which precipitate out at low temperatures and impair the flowability of the oils, for example in the course of transport in pipelines. Often, crude oil and products derived therefrom also comprise asphaltenes which are composed of a multitude of structures, particularly high molecular weight, fused aromatic systems with heteroaromatics, and are present as a colloidal suspension in the oil. In view of the complexity of their chemistry, asphaltenes are described as the oil fraction which is soluble in toluene but not in n-pentane. These asphaltenes can precipitate out, for example, in the event of pressure variations or in the event of evaporation of higher-volatility constituents of the oil. Equally, asphaltenes can precipitate out when, for example, bitumen, heavy oils and residue oils are diluted with solvents for the purpose of lowering the viscosity for transport. Precipitated asphaltenes cause problems in the production and in the processing of crude oils and products derived therefrom by precipitating in valves, pipes and conveying units. The carbonization of these precipitates on hot surfaces, for example heat exchangers, can make them very difficult to remove. The precipitates of asphaltenes and/or waxes reduce the efficiency of plants and can lead in the worst case to complete blockage and to a production stoppage, which causes high costs.

Various types of additives are therefore used in production and processing of crude oil. They are predominantly synthetic monomers and also polymeric compounds.

For example, demulsifiers are used to split emulsions as occur in the extraction of crude oils. The problems caused by asphaltene precipitates in the course of handling and storage of oils can be prevented or reduced by addition of small amounts of so-called dispersants. These dispersants are intended to decrease the amount of precipitate by reduction in asphaltene agglomeration, slow the formation of precipitates, bring about final distribution of the precipitate and/or reduce the tendency of the precipitate to be deposited on surfaces. So-called paraffin inhibitors improve the cold flowability, for example by modifying the crystal structure of the paraffins which precipitate out in the course of cooling. They prevent the formation of a three-dimensional network of paraffin crystals and thus lead to a lowering of the pour point.

One compound class used for various purposes in crude oils is that of alkylphenol resins and derivatives thereof, which are produced by condensation of alkylphenols with aldehydes under acidic or basic conditions.

Often, the action of the known oil additives is, however, unsatisfactory. Since the composition of crude oils and products produced therefrom varies, individual additives can work effectively only within a restricted range. Sometimes, small changes in the oil composition even have a great effect on the effectiveness of the additives. Therefore, the action of the known alkylphenol resins is unsatisfactory in some cases, so that there is a need for additional alternatives. Especially in heavy crude oils or products derived therefrom with a high asphaltene content and simultaneously high content of n-paraffins, the effectiveness of the prior art alkylphenol resins is insufficient.

Typically, the condensation reaction for preparing alkylphenol resins is carried out in relatively high-boiling aromatic solvents. Moreover, alkylphenol resins, which are highly viscous or brittle polymers per se, have to be dissolved in a solvent for use as oil additives. Owing to the physicochemical properties of the alkylphenol resins, preference is given to relatively high-boiling aromatic hydrocarbons or technical hydrocarbon mixtures both for the condensation and for the preparation of concentrates. These contain typically 10% by weight and more of polyaromatic hydrocarbons. Owing to their dissolution properties, aliphatic hydrocarbons are unsuitable for alkylphenol resins.

The solvents used currently as a reaction medium and also as a solvent for alkylphenol resins are generally relatively high-boiling aromatics-rich fractions from the distillation of crude oils. They comprise polycyclic aromatic hydrocarbons which are considered to be harmful to the health of living beings and to the environment. The content of polycyclic aromatic hydrocarbons in additives, especially in offshore applications, is therefore being viewed ever more critically and restricted. The health objections with regard to the polycyclic aromatic hydrocarbons also known as polyaromatics, for example naphthalene which is suspected of being carcinogenic, are causing a search for new ways to reduce these substances in industrial products. Polyaromatic hydrocarbons are understood here to mean compounds which contain at least two fused aromatic rings.

U.S. Pat. No. 2,499,368 discloses the use of oxyalkylated alkylphenol resins as demulsifiers for mineral oil emulsions.

GB 1 173 975 discloses the use of alkylphenol resins for lowering the viscosity of crude oils and fuel oils at low temperature. GB 2 305 437 discloses alkylphenol resins for lowering the pour point of paraffin liquids.

U.S. Pat. No. 5,021,498 discloses alkylphenol-formaldehyde resins as asphaltene dispersants.

EP-A-0 381 966 discloses a process for preparing novolaks by condensing phenols with aldehydes with azeotropic separation of water.

In the context of the present invention, alkylphenol resins are understood to mean all polymers which are obtainable by condensing a phenol bearing alkyl radicals with aldehydes or ketones. The alkyl radical may be bonded to the aryl radical of the phenol directly via a C—C bond or else via functional groups such as esters or ethers. The phenol and the alkylphenol resin may be alkoxylated.

It is thus an object of the present invention to provide crude oils with improved properties. Since the additives used to improve crude oil properties are generally used in the bore hole and hence also to an increasing degree at sea, the aim was additionally to find an additive which is substantially free of monomeric or low molecular weight polyaromatic compounds.

It has been found that the condensation of alkylphenols with aldehydes in the presence of fatty acids having 2-50 carbon atoms or derivatives thereof, for example esters with alcohols having from 1 to 10 carbon atoms and from 1 to 5 OH groups, leads to resins with improved performance properties as additives for crude oils and products derived therefrom. In particular, they ensure more efficient splitting of emulsions, improved asphaltene dispersion and improved cold flow behavior. At the same time, the fatty acids mentioned and their derivatives are suitable solvents for preparing additive concentrates and allow the preparation of additive concentrates which are free of polycyclic aromatic hydrocarbons and thus do not lead to environmental pollution in the event of unintended release.

The invention thus provides crude oils and products which have been produced therefrom and comprise distillation residues, comprising alkylphenol-aldehyde resins having a repeat structural unit of the formula

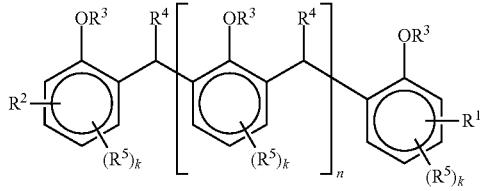

where
$R^1$ is a branched alkyl or alkenyl radical which has from 10 to 40 carbon atoms and bears at least one carboxyl, carboxylate and/or ester group,
$R^2$ is hydrogen or $R^1$
$R^3$ is hydrogen or an alkoxy group of the formula $-(A-O)_m-H$, A is a $C_2$- to $C_4$-alkylene group,
m is from 1 to 100,
$R^4$ is hydrogen, a $C_1$- to $C_{11}$-alkyl radical or a carboxyl group,
$R^5$ is $C_1$-$C_{200}$-alkyl or -alkenyl, O—$R^6$ or O—C(O)—$R^6$,
$R^6$ is $C_1$-$C_{200}$-alkyl or -alkenyl,
n is from 1 to 100 and
k is 1 or 2.

The invention further provides for the use of the inventive alkylphenol-aldehyde resin for splitting of emulsions of water and crude oils or products which have been derived therefrom and comprise distillation residues.

The invention further provides for the use of the inventive alkylphenol-aldehyde resin for improving the cold flowability of crude oils and products which have been derived therefrom and comprise distillation residues.

The invention further provides for the use of the inventive alkylphenol-aldehyde resin as an asphaltene dispersant in crude oils and products which have been derived therefrom and comprise distillation residues.

A is preferably an ethylene and/or propylene group, in particular an ethylene group.

m is preferably from 2 to 50, in particular from 3 to 20.

$R^4$ is preferably hydrogen or $C_1$- to $C_3$-alkyl, in particular hydrogen.

$R^6$ is preferably $C_4$-$C_{50}$-alkyl or -alkenyl and in particular $C_6$-$C_{30}$-alkyl or -alkenyl. $R^5$ is more preferably $C_4$-$C_{50}$-alkyl or -alkenyl and in particular $C_6$-$C_{30}$-alkyl or -alkenyl.

n is preferably from 2 to 50 and especially from 3 to 25, for example from 5 to 15.

k is preferably 1. Moreover, it is preferred that k is equal to 1 and $R^5$ is in the para-position to the $OR^3$ group.

$R^1$ is preferably a $C_{12}$-$C_{24}$-alkyl or -alkenyl radical and is in particular a $C_{16}$-$C_{20}$-alkyl or -alkenyl radical. The $R^1$ radical is preferably bonded to the aromatic ring system via a secondary carbon atoms of the alkyl chain. This bond results from the alkylation of the phenol via a double bond of the unsaturated fatty acid or of the unsaturated fatty acid derivative, which determines its position within the side chain. The $R^1$ radical is preferably saturated. In a further preferred embodiment, the $R^1$ radical contains one or two double bonds, in particular one double bond. The $R^1$ radical preferably bears a terminal carboxyl group. In a further preferred embodiment, the $R^1$ radical bears a terminal ester moiety whose alcohol component derives from an alcohol having from 1 to 5 carbon atoms and from 1 to 6 OH groups.

This ester more preferably derives from alcohols having from 1 to 4 carbon atoms, for example methanol, ethanol and propanol.

Carboxylic acid groups present in the inventive alkylphenol resin may, after condensation, have been neutralized fully or partly, for example to an extent of 90%, to an extent of 70%, to an extent of 50%, to an extent of 25% or to an extent of 10%. This neutralization is preferably effected with ammonia, amines or aromatic bases. Suitable amines are primary, secondary and tertiary amines whose alkyl radicals each independently bear from 1 to 24 carbon atoms, preferably from 4 to 22 carbon atoms. Equally suitable for neutralization are aromatic bases which contain a cyclic, fully conjugated hydrocarbon skeleton with $4n+2\pi$-electrons and at least one heteroatom capable of salt formation, preferably nitrogen, for example pyridine and imidazole.

Carboxylic acid groups present in the inventive alkylphenol resin may, after the condensation, be reacted with alkylene oxides fully or partly, for example to an extent of 90%, to an extent of 70%, to an extent of 50%, to an extent of 25% or to an extent of 10%. Suitable alkylene oxides are ethylene oxide, propylene oxide, butylene oxide and mixtures thereof. The oxyalkylation is effected preferably with from 1 to 100 mol, in particular with from 5 to 20 mol, of alkylene oxide per carboxylic acid group. In the case of mixtures of different alkylene oxides, either random copolymers or block copolymers may be preferred depending on the oil to be additized.

The inventive alkylphenol-aldehyde resins are obtainable, for example, by condensing the corresponding alkylphenols with an aldehyde or ketone, for example formaldehyde, i.e. preferably from 0.5 to 1.5 mol, in particular from 0.8 to 1.2 mol, of aldehyde or ketone per mole of alkylphenol, the condensation being effected in the presence of a fatty acid or of a fatty acid derivative, preferably of a fatty acid alkyl ester. The condensation is carried out preferably in the presence of from 1 to 70% by weight, preferably from 3 to 60% by weight, in particular from 5 to 50% by weight, of the fatty acid or of the fatty acid ester based on the total amount of alkylphenol, aldehyde or ketone and fatty acid or fatty acid ester. Fatty acid or fatty acid ester may be added as a reagent in small concentrations, for example from 1 to 10% by weight and preferably from 2 to 5% by weight, but they are more preferably added in larger amounts of from 10 to 70% by weight and especially from 20 to 60% by weight, which lowers the viscosity of the reaction mixture and hence eases its handling. After the reaction has ended, excess fatty acid or fatty acid derivative can be removed, for example by distillation, but they preferably remain in the resin. The inventive alkylphenol resins and the oils comprising them contain preferably from 0.2 to 5 parts by weight, more preferably from 0.3 to 3 parts by weight, for example from 0.5 to 2 parts by weight, of at least one fatty acid or a fatty acid derivative, especially of a fatty acid ester, per part by weight of alkylphenol resin.

The condensation is effected preferably between 70 and 200° C., for example between 90 and 160° C. It is catalyzed typically by from 0.05 to 5% by weight of bases or acids. Useful catalysts for the condensation reactions of alkylphenol and aldehyde are, in addition to carboxylic acids such as acetic acid and oxalic acid, in particular strong mineral acids such as hydrochloric acid, phosphoric acid and sulfuric acid, and also sulfonic acids. Particularly suitable catalysts are sulfonic acids which contain at least one sulfonic acid group and at least one saturated or unsaturated, linear, branched and/or cyclic hydrocarbon radical having from 1 to 40 carbon atoms and preferably having from 3 to 24 carbon atoms. Particular preference is given to aromatic sulfonic acids, especially alkylaromatic monosulfonic acids having one or more $C_1$-$C_{28}$-alkyl radicals and in particular those having $C_3$-$C_{22}$-alkyl radicals. The alkylaromatic sulfonic acids bear preferably one or two alkyl radicals, in particular one alkyl radical. The parent aryl groups are preferably mono- and bicyclic, in particular monocyclic. In a preferred embodiment, the aryl groups bear no carboxyl groups and they especially bear only sulfonic acid and alkyl groups. Suitable examples are methanesulfonic acid, butanesulfonic acid, benzenesulfonic acid, p-toluenesulfonic acid, xylenesulfonic acid, 2-mesitylenesulfonic acid, 4-ethylbenzenesulfonic acid, isopropylbenzenesulfonic acid, 4-butylbenzenesulfonic acid, 4-octylbenzenesulfonic acid; dodecylbenzenesulfonic acid, didodecylbenzenesulfonic acid, naphthalenesulfonic acid. Mixtures of these sulfonic acids are also suitable. After the reaction has ended, they typically remain in the product as such or in neutralized form.

The acidic catalyst used for the condensation of the alkylphenol resin is preferably neutralized with a base such as sodium hydroxide solution or potassium hydroxide solution, or preferably with amines or aromatic bases. The neutralization is effected preferably by reacting the acid used as a catalyst with from 0.8 to 10 mol of base, preferably from 0.9 to 5 mol of base, more preferably from 0.95 to 2 mol of base, for example in an about equimolar amount. Especially in the case of polybasic acids and/or bases, the number of moles of the total amount of acid and base groups to be converted is considered. The salt formed can subsequently be removed, but it preferably remains in the alkylphenol resin.

The inventive fuel oils preferably contain from 1 to 1000 ppm, more preferably from 5 to 150 ppm and especially from 10 to 100 ppm of at least one inventive alkylphenol resin.

Alkylphenol-aldehyde resins suitable in accordance with the invention are especially those which derive from alkylphenols having one or two alkyl radicals in the ortho- and/or para-position to the OH group. Particularly preferred starting materials are alkylphenols which bear, on the aromatic ring, two hydrogen atoms capable of condensation with aldehydes, and especially monoalkylated phenols. More preferably, the alkyl radical is in the para-position to the phenolic OH group. For the preparation of the inventive alkylphenol-aldehyde resins preference is given to using alkylphenols which consist of p-alkylphenols to an extent of at least 50 mol%, more preferably of at least 70 mol% and especially of more than 90 mol%, for example of more than 95 or more than 97 mol%, of p-alkylphenols based on the totality of the alkylphenols used. The proportion of trifunctional phenols which can enter into condensation with aldehydes via two ortho- and one para-position to the OH group is preferably below 10 mol% and in particular below 5 mol%, for example below 4 mol% based on the totality of the alkylphenols used. The alkyl radicals (which, for the alkylphenols, are generally understood to mean hydrocarbon radicals as defined above) may be the same or different in the alkylphenol-aldehyde resins usable in the process according to the invention, they may be saturated or unsaturated and have 1-200, preferably 4-50, in particular 6-30 carbon atoms; they are preferably n-, iso- and tert-butyl, n- and isopentyl, n- and isohexyl, n- and isooctyl, n- and isononyl, n- and isodecyl, n- and isododecyl, tetradecyl, hexadecyl, octadecyl, eicosyl, tetracosyl, tripropenyl, tetrapropenyl, poly(propenyl) and poly(isobutenyl) radicals. These radicals are preferably saturated.

Suitable alkylphenol resins may also contain or consist of structural units of further phenol analogs such as salicylic acid, hydroxybenzoic acid and derivatives thereof, such as esters, amides and/or salts.

Suitable aldehydes for the preparation of the inventive alkylphenol-aldehyde resins are those having from 1 to 12 carbon atoms and preferably those having from 1 to 4 carbon atoms, for example formaldehyde, acetaldehyde, propionaldehyde, butyraldehyde, 2-ethylhexanal, benzaldehyde, glyoxalic acid and their reactive equivalents such as paraformaldehyde and trioxane. Particular preference is given to formaldehyde in the form of paraformaldehyde and especially formalin.

The inventive alkylphenol resins have molecular weights, preferably measured by means of gel permeation chromatography against poly(styrene) standards in THF, of from 400 to 25 000 g/mol, preferably from 600 to 10 000 g/mol and especially from 800 to 5000 g/mol. The polydispersity Mw/Mn is preferably between 1.2 and 9.0, preferentially between 1.5 and 5.0. A prerequisite here is that the alkylphenol-aldehyde resins are oil-soluble at least in application-relevant concentrations of 0.001 to 1% by weight.

Suitable fatty acids for preparing the inventive alkylphenol resins have preferably from 6 to 40, in particular from 10 to 26 and especially from 12 to 22 carbon atoms. The alkenyl radicals and any alkyl radicals of the fatty acids consist essentially of carbon and hydrogen. However, they may also bear further substituents, for example hydroxyl or halogen groups, provided that they do not impair the predominant hydrocarbon character. Preference is given to fatty acids having linear and branched hydrocarbon radicals; particular preference is given to linear radicals. The fatty acids contain preferably at least one double bond. This is preferably not in the α,β-position to the carbonyl function. They may contain a plurality of double bonds, for example 2 or 3 double bonds, and be of natural or synthetic origin. In the case of polyunsaturated carboxylic acids, their double bonds may be isolated or else conjugated. Preference is given to mixtures of two or more unsaturated fatty acids having from 10 to 26 carbon atoms. In particularly preferred fatty acid mixtures, at least 50% by weight, especially at least 75% by weight, for example at least 90% by weight of the fatty acids contain one or more double bonds. The iodine numbers of the parent fatty acids or fatty acid mixtures of the inventive esters are preferably above 50 g of I/100 g, more preferably between 60 and 190 g of I/100 g, in particular between 100 and 180 g of I/100 g and especially between 120 and 180 g of I/100 g of fatty acid or fatty acid mixture.

Suitable unsaturated fatty acids are, for example, oleic acid, erucic acid, palmitoleic acid, myristoleic acid, linoleic acid, linolenic acid, eleosteric acid, arachidonic acid and/or ricinoleic acid. Preference is given in accordance with the invention to using fatty acid mixtures obtained from natural fats and oils, for example coconut oil fatty acid, peanut oil fatty acid, fish oil fatty acid, linseed oil fatty acid, palm oil fatty acid, rapeseed oil fatty acid, ricinene fatty acid, castor oil fatty acid, colza oil fatty acid, soybean oil fatty acid, sunflower oil fatty acid, safflower oil fatty acid and tall oil fatty acid, and also fractions obtained therefrom, for example by distillation.

Likewise suitable as a constituent of the fatty acid mixtures are dicarboxylic acids such as dimer fatty acids and alkyl- and alkenylsuccinic acids with $C_8$-$C_{50}$-alk(en)yl radicals, preferably with $C_8$-$C_{40}$-, in particular with $C_{12}$-$C_{22}$-alk(en)yl radicals. The alkyl radicals may be linear or else branched (oligomerized alkenes, polyisobutylene) and saturated or unsaturated. Preference is given to fractions of up to 10% by weight, in particular less than 5% by weight, based on constituent A).

Preferred fatty acid mixtures contain minor amounts, i.e. up to 20% by weight, preferably less than 10% by weight, in particular less than 5% by weight and especially less than 2% by weight, of saturated fatty acids, for example lauric acid, tridecanoic acid, myristic acid, pentadecanoic acid, palmitic acid, margaric acid, stearic acid, isostearic acid, arachic acid and behenic acid.

The fatty acids may further contain minor amounts of up to 20% by weight, preferably up to 25% by weight, for example from 1 to 5% by weight of resin acids, for example abietic acid, dihydroabietic acid, tetrahydroabietic acid, dehydroabietic acid, neoabietic acid, pimaric acid, levopimaric acid, palustric acid and their derivatives. They more preferably contain less than 2% by weight and are especially essentially free of resin acids.

Particularly suitable fatty acid esters for preparing the inventive alkylphenol resins are those which derive from the abovementioned fatty acids and lower alcohols. having from 1 to 5 carbon atoms, particular preference being given to esters of the abovementioned fatty acids with lower alcohols having from 1 to 5 carbon atoms and only one OH group. Examples of particularly suitable alcohols are methanol, ethanol and propanol, especially methanol. Particularly suitable fatty acid esters are esters derived from vegetable oils, such as rapeseed oil acid methyl ester, sunflower oil acid methyl ester, soybean fatty acid methyl ester, palm oil acid methyl ester and tall oil fatty acid methyl ester. Also suitable are esters of polyhydric alcohols having from 2 to 6 OH groups, preferably having 2 or 3 OH groups, for example ethylene glycol, diethylene glycol, glycerol and trimethylolpropane.

The fatty acid esters can be prepared from alcohols and fatty acids in a known manner by esterification. Preference is given to the transesterification of naturally occurring fats and oils with lower alcohols and especially with methanol to form glycerol as a by-product. Preference is given to those esters which are preparable from a fatty acid mixture.

The inventive compounds are typically used in concentrations of from 0.5 to 10 000 ppm, preferably from 2 to 2000 ppm and in particular from 5 to 500 ppm, based on the oil to be additized.

For use as a demulsifier, particular preference is given to inventive alkylphenol-formaldehyde resins with $C_2$-$C_{40}$-alkyl radicals of the alkylphenol, preferably with $C_4$-$C_{20}$-alkyl radicals, for example $C_6$-$C_{12}$-alkyl radicals. The alkyl radicals may be linear or branched, and are preferably branched. Particularly suitable alkylphenol-aldehyde resins derive from branched alkyl radicals having from 4 to 9 carbon atoms. The mean molecular weight determined by means of GPC is preferably between 700 and 20 000 g/mol, in particular between 800 and 10 000 g/mol, for example between 1000 and 3000 g/mol. The degree of polymerization n is preferably from 1 to 20, in particular from 2 to 15, for example from 5 to 10. The terminal $R^1$ radicals derive preferably from lower alkyl esters of unsaturated fatty acids and in particular from methyl esters of vegetable oils and fats. In a preferred embodiment, the $R^1$ radicals derive from fatty acids which, after the condensation, are reacted with alkylene oxides. The degree of alkoxylation is up to 500 mol, preferably from 1 to 100 mol and in particular from 2 to 20 mol, of alkylene oxide per OH group or carboxyl group. Particularly preferred alkylene oxides are ethylene oxide, propylene oxide and mixtures thereof. In the case of mixed alkoxylates, the alkoxylation can be effected either sequentially or randomly. The molar ratio between ethylene oxide and propylene oxide is preferably between 1:10 and 10:1. The dosage rates are preferably between 0.1 and 1000 ppm, preferably between 1 and 500 ppm and in particular between 10 and 200 ppm, based on the oil content of the emulsion.

For use as asphaltene dispersants, particular preference is given to inventive alkylphenol-formaldehyde resins whose alkyl radicals bear from 1 to 30 carbon atoms or, in the case of alkenyl radicals, from 2 to 30 carbon atoms and preferably from 4 to 24 carbon atoms. Relatively short alkyl or alkenyl radicals having, for example, from 3 to 12 carbon atoms are preferably branched; relatively long alkyl and alkenyl radicals having, for example, more than 12 carbon atoms are preferably linear. The $R^3$ radical is preferably hydrogen. The degree of polymerization (n) here is preferably between 2 and 50, preferably between 3 and 20 alkylphenol units. The mean molecular weight $M_n$ determined by means of GPC against poly(styrene) standards is preferably between 700 and 15 000 g/mol, preferably between 800 and 7000 g/mol and in particular between 1000 and 2500 g/mol. The terminal $R^1$ radical is derived preferably from lower alkyl esters of unsaturated fatty acids and in particular from methyl esters of vegetable oils and fats. For use as asphalt dispersants, based on the oil to be additized, preference is given to using dosage rates of from 5 to 5000 ppm, in particular from 10 to 2000 ppm, for example of 20-200 ppm.

For use as a paraffin inhibitor for improving the cold flowability of crude oils and products derived therefrom, particular preference is given to inventive alkylphenol-formaldehyde resins whose alkyl radicals bear from 12 to 100 carbon atoms, preferably from 18 to 60 carbon atoms, for example from 22 to 50 carbon atoms. For heavier crude oils and products which have been produced therefrom and comprise distillation residues with a high content of long-chain n-paraffins having more than 30 carbon atoms, it has been found that especially alkylphenol-formaldehyde resins whose alkyl radicals bear more than 30 carbon atoms are particularly useful. The alkyl radicals are preferably linear. In a further preferred embodiment, the alkyl radicals derive from oligomers or polymers of olefins having from 2 to 6 carbon atoms, for example from poly(isobutylene) and are thus branched. The alkyl radicals deriving from oligo- and polymers of lower olefins preferably have a molecular weight of from 500 to 3000 g/mol. The degree of polymerization (n) here is preferably between 2 and 50, preferably between 3 and 20 alkylphenol units. The mean molecular weight Mn determined by means of GPC against poly(styrene) standards is preferably between 1000 and 20 000 g/mol and in particular between 2000 and 6000 g/mol. The $R^3$ radical is preferably hydrogen. The terminal $R^1$ radical is derived preferably from lower alkyl esters of unsaturated fatty acids and in particular from methyl esters of vegetable oils and fats. In the case of this use, the dosage rates are typically between 10 and 5000 ppm, in particular between 20 and 2000 ppm, for example between 30 and 500 ppm.

For the purposes of simple handling, the inventive alkylphenol-aldehyde resins are preferably used as concentrates which contain from 10 to 90% by weight and preferably from 20 to 60% by weight of solvents. Suitable solvents are relatively high-boiling aliphatic hydrocarbons, aromatic hydrocarbons, alcohols, esters, ethers and mixtures thereof. However, from an ecological point of view, particularly preferred solvents are the fatty acids and their derivatives which have also been used as the reaction medium to prepare the inventive alkylphenol-aldehyde resins, and in particular the abovementioned fatty acid esters.

The inventive alkylphenol-aldehyde resins may be used alone or else together with other additives. For instance, for use as pour points depressants, it has been found to be particularly useful, for example, to use them together with prior art alkylphenol resins, with poly(alkylacrylates), poly(alkyl methacrylates), ethylene-vinyl ester copolymers, with esterified copolymers of dicarboxylic acids and olefins, and also with other dewaxing assistants. For use as an asphaltene dispersant, it has been found to be particularly useful to use them together with prior art alkylphenol resins, with alkyl sarcosinates, with alkylphosphonic esters and also with reaction products of poly(isobutenyl)succinic anhydrides and poly(amines) or polyols, for example poly(glycerol). For use as a demulsifier, it has been found to be particularly useful to use them together with prior art alkylphenol resins, with crosslinked block copolymers of ethylene oxide and propylene oxide, and with alkoxylated poly(alkyleneamines).

In addition, the inventive alkylphenol-aldehyde resins may be used together with further additives such as antioxidants, dehazers, dispersants, defoamers, corrosion inhibitors, naphthenate inhibitors, and/or additives for lowering the wax appearance temperature.

The inventive alkylphenol-aldehyde resins are suitable for improving the properties of crude oils and products derived therefrom. Derived products are understood here to mean the mineral oil fractions which are produced from crude oil and comprise distillation residues, such as heating oil, fuel oil, bunker C oil and bitumen. Especially those inventive alkylphenol resins whose phenolic hydroxyl group has been alkoxylated are suitable for separating water-in-oil emulsions, as are obtained, for example, in crude oil extraction but also in the fine desalination of crude oils in the refinery. In addition, they are suitable for bringing paraffins which have precipitated out and are adhering to surfaces of units or conveying lines back into solution.

The inventive alkylphenol-aldehyde resins are also suitable for dispersing asphaltenes and/or paraffin waxes in crude oils and products derived therefrom, their effectiveness being superior to that of the prior art additives. They firstly lower the intrinsic pour point of the additized oils and also the flow limit, which is of great significance, for example, in the restart of pipelines.

They are particularly suitable for the improvement of the properties of crude oils and mineral oil fractions which are produced therefrom and comprise distillation residues, such as heavy heating oil, fuel oil, bunker C oil and bitumen.

As a result of the use of renewable raw materials as the reaction medium and solvent, the inventive alkylphenol-aldehyde resins have improved environmental compatibility. Thus, the biodegradability of the inventive alkylphenol-aldehyde resins is significantly higher than that of the prior art additives.

In the course of handling during preparation and processing, the inventive alkylphenol-aldehyde resins lead to a lower level of health risk for the personnel involved. In addition, in the event of product emissions, for example in the course of transferring or in the course of use, they lead to a lower level of environmental pollution than the prior art additives.

EXAMPLES

The following additives were used:
A) Preparation of an Acid-Catalyzed Nonylphenol-Formaldehyde Resin in Rapeseed Oil Acid Methyl Ester A 1 L stirred apparatus with water separator and $N_2$ stream was initially charged with 241 g of nonylphenol, 82 g of rapeseed oil acid methyl ester and 1.6 g of alkylbenzenesulfonic acid. The mixture was heated to 120° C. with stirring. 90 g of 35% formaldehyde solution were then added dropwise thereto and the water of reaction was distilled off. After the dropwise addition, the reaction mixture was heated to 145° C. and stirred at 145° C. for another 1 h. After cooling to 100° C., a further 126 g of rapeseed oil methyl ester were added.

The resulting polymer had a molecular weight Mw of 2700 g/mol and an acid number of 0.5 mg KOH/g. In the $^{13}$C NMR spectrum (500 MHz, $CDCl_3$ solvent) of the polymer, after removal of the solvent, signals at 174 and 51.5 ppm show the presence of a methyl ester, signals at 130 ppm show the presence of olefinic double bonds and additional signals in the range from 8 to 42 ppm show the presence of relatively long alkyl radicals.

B) Preparation of an Acid-Catalyzed Dodecylphenol-Formaldehyde Resin in Rapeseed Oil Acid Methyl Ester A 500 mL stirred apparatus with water separator and $N_2$ stream was initially charged with 124.4 g of dodecylphenol, 132.0 g of rapeseed oil acid methyl ester and 1.4 g of alkylbenzenesulfonic acid. The mixture was heated to 120° C. with stirring. 42.2 g of 35% formaldehyde solution were then added dropwise thereto and the water of reaction was distilled off. After the dropwise addition, the mixture was stirred at 120° C. for 1 h, then heated to 145° C., and the reaction mixture was stirred at this temperature for another 1 h.

The resulting polymer had a molecular weight Mw of 3200 g/mol and an acid number of 0.3 mg KOH/g. In the 13C NMR spectrum (500 MHz, CDCl3 solvent) of the polymer, after removal of the solvent, signals at 174 and 51.5 ppm show the presence of a methyl ester, signals at 130 ppm show the presence of olefinic double bonds and additional signals in the range from 8 to 42 ppm show the presence of relatively long alkyl radicals.

C) Preparation of an Acid-Catalyzed $C_{20/24}$-Alkylphenol-Formaldehyde Resin in Rapeseed Oil Acid Methyl Ester A 500 mL stirred apparatus with water separator and $N_2$ stream was initially charged with 115.7 g of $C_{20/24}$-alkylphenol and 158.3 g of rapeseed oil acid methyl ester. The mixture was heated to 120° C. with stirring. 26.0 g of 35% formaldehyde solution were then added dropwise thereto and the water of reaction was distilled off. After the dropwise addition, the mixture was stirred at 120° C. for 1 h, then heated to 145° C., and the reaction mixture was stirred at this temperature for another 1 h.

The resulting polymer had a molecular weight Mw of 2500 g/mol and an acid number of 0.3 mg KOH/g. In the 13C NMR spectrum (500 MHz, CDCl3 solvent) of the polymer, after removal of the solvent, signals at 174 and 51.5 ppm show the presence of a methyl ester, signals at 130 ppm show the presence of olefinic double bonds and additional signals in the range from 8 to 42 ppm show the presence of relatively long alkyl radicals.

D) Preparation of an Acid-Catalyzed Nonylphenol-Formaldehyde Resin in Tall Oil Fatty Acid A 500 mL stirred apparatus with water separator and $N_2$ stream was initially charged with 96.3 g of nonylphenol, 66.8 g of tall oil fatty acid and 0.64 g of alkylbenzenesulfonic acid. The mixture was heated to 120° C. with stirring. 36.2 g of 35% formaldehyde solution were then added dropwise thereto and the water of reaction was distilled off. After the dropwise addition, the reaction mixture was heated to 145° C. and stirred at 145° C. for another 1 h.

The resulting polymer had a molecular weight Mw of 2100 g/mol. In the $^{13}$C NMR spectrum (500 MHz, $CDCl_3$ solvent) of the polymer, after removal of the solvent, signals at 178 ppm show the presence of a carboxylic acid, signal at 130 ppm show the presence of olefinic double bonds and additional signals in the range from 8 to 42 ppm show the presence of relatively long alkyl radicals.

E) Nonylphenol-Formaldehyde Resin Prepared under Acidic Catalysis in Solvent Naphtha in Analogy to A1 (Comparative Example). Mw=2400 g/mol, 50% in Solvent Naphtha F) $C_{20/24}$-Alkylphenol-Formaldehyde Resin Prepared under Acidic Catalysis in Solvent Naphtha in Analogy to A3 (Comparative Example). Mw=2700 g/mol, 50% in Solvent Naphtha Effectiveness of the Additives as Asphaltene Dispersants The dispersion and the precipitation of asphaltenes depends upon the nature of the hydrocarbon medium. Asphaltenes are soluble in aromatic but not in aliphatic hydrocarbons. Thus, dispersants can be tested by dissolving the oil or extracted asphaltenes in an aromatic solvent and by then adding an aliphatic hydrocarbon in order to obtain a precipitate. Depending on the API density of the asphaltenic oil used, it is diluted with toluene in a ratio of from 1:3 to 1:10. The dispersing action of the additives is determined by determining the separability number to ASTM D7061-04. A low separability number shows good stabilization of the asphaltenes.

Results

The investigations were performed on a fuel oil No. 6 from a Turkish refinery, which contained considerable amounts of asphaltenes. Table 1 shows the results of the dispersion test after dilution of the oil with toluene in a ratio of 1:9 with various inventive substances in comparison to a prior art alkylphenol resin.

TABLE 1

Asphaltene dispersion

| Experiment | Additive | Separability number |
|---|---|---|
| 1 | none | 7.09 |
| 2 | 100 ppm A | 0.13 |
| 3 | 100 ppm B | 0.22 |
| 4 | 100 ppm D | 0.15 |
| 5 (comp.) | 100 ppm E | 0.86 |

The experiments show that the inventive alkylphenol-aldehyde resins are superior to the prior art additives with regard to the asphaltene dispersion. They bring about improved asphaltene dispersion or alternatively comparable asphaltene dispersion with lower additive dosage.

Effectiveness of the Additives as Paraffin Inhibitors

The improvement in the cold flow behavior is determined to DIN ISO 3016. A low pour point of the oil indicates good effectiveness.

The measurements were carried out on a South American crude oil.

TABLE 2

Cold flow improvement with use of 200 ppm of dispersant

| Additive | Pour point @ 500 ppm | Pour point @ 1000 ppm |
|---|---|---|
| none | 21° C. | 21° C. |
| C | 15° C. | 6° C. |
| F (comparison) | 18° C. | 9° C. |

What is claimed is:

1. A crude oil or product which has been produced therefrom and comprises distillation residues, comprising an alkylphenol-aldehyde resin having a repeat structural unit of the formula

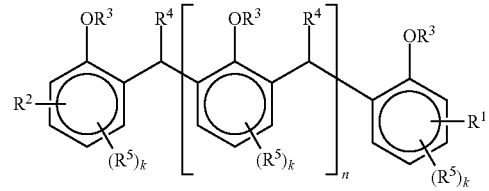

where $R^1$ is a branched alkyl or alkenyl radical which has from 10 to 40 carbon atoms and bears at least one carboxyl or carboxylate or ester group, which is bonded to the aromatic system via a secondary carbon atom of the alkyl or alkenyl chain, $R^2$ is hydrogen or $R^1$ $R^3$ is hydrogen or an alkoxy group of the formula $-(A-O)_m-H$, A is a $C_2$- to $C_4$-alkylene group, m is from 1 to 100, $R^4$ is hydrogen, a $C_1$- to $C_{11}$-alkyl radical or a carboxyl group, $R^5$ is $C_1$-$C_{200}$-alkyl or -alkenyl, O—$R^6$, $R^6$ is $C_1$-$C_{200}$-alkyl or -alkenyl, n is from 1 to 100 and k is 1 or 2.

2. The crude oil or product which has been produced therefrom and comprises distillation residues as claimed in claim 1, wherein $R^1$ is $C_{12}$- to $C_{22}$-alkyl or -alkenyl.

3. The crude oil or product which has been produced therefrom and comprises distillation residues as claimed in claim 1, wherein $R^3$ is hydrogen.

4. The crude oil or product which has been produced therefrom and comprises distillation residues as claimed in claim 1, wherein A is an ethylene or a propylene group.

5. The crude oil or product which has been produced therefrom and comprises distillation residues as claimed in claim 1, wherein $R^4$ is hydrogen.

6. The crude oil or product which has been produced therefrom and comprises distillation residues of claim 1, wherein $R^5$ and $R^6$ are each independently $C_4$- to $C_{50}$-alkyl.

7. The crude oil or product which has been produced therefrom and comprises distillation residues of claim 1, wherein n is from 2 to 50.

8. A method for splitting an emulsion in a mixture of oil and water, said method comprising adding to the mixture at least one alkylphenol-aldehyde resin having a repeat structural unit of the formula

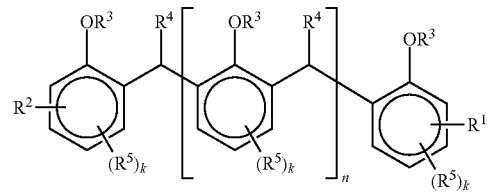

where $R^1$ is a branched alkyl or alkenyl radical which has from 10 to 40 carbon atoms and bears at least one carboxyl or carboxylate or ester group, which is bonded to the aromatic system via a secondary carbon atom of the alkyl or alkenyl chain, $R^2$ is hydrogen or $R^1$ $R^3$ is hydrogen or an alkoxy group of the formula -(A-O)$_m$—H, A is a $C_2$- to $C_4$-alkylene group,
m is from 1 to 100,
$R^4$ is hydrogen, a $C_1$- to $C_{11}$-alkyl radical or a carboxyl group,
$R^5$ is $C_1$-$C_{200}$-alkyl or -alkenyl, or O—$R^6$,
$R^6$ is $C_1$-$C_{200}$-alkyl or -alkenyl,
n is from 1 to 100 and
k is 1 or 2
wherein said oil comprises a crude oil or a product derived from crude oil comprising a distillation residue.

9. A method for dispersing asphaltenes in an oil mixture comprising oil and asphaltenes, said method comprising adding to the oil mixture at least one alkylphenol-aldehyde resin having a repeat structural unit of the formula

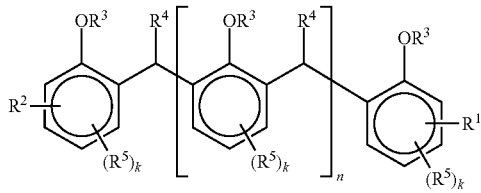

where
  $R^1$ is a branched alkyl or alkenyl radical which has from 10 to 40 carbon atoms and bears at least one carboxyl, carboxylate and/or ester group, which is bonded to the aromatic system via a secondary carbon atom of the alkyl or alkenyl chain,
  $R^2$ is hydrogen or $R^1$
  $R^3$ is hydrogen or an alkoxy group of the formula -(A-O)$_m$—H, A is a $C_2$- to $C_4$-alkylene group,
  m is from 1 to 100,
  $R^4$ is hydrogen, a $C_1$- to $C_{11}$-alkyl radical or a carboxyl group,
  $R^5$ is $C_1$-$C_{200}$-alkyl or -alkenyl, or O—$R^6$,
  $R^6$ is $C_1$-$C_{200}$-alkyl or -alkenyl,
  n is from 1 to 100 and
  k is 1 or 2
  wherein the oil comprises a crude oil or a product derived from crude oil comprising a distillation residue.

10. A method for improving the cold flow properties of an oil, said method comprising adding to said oil at least one alkylphenol-aldehyde resin having a repeat structural unit of the formula

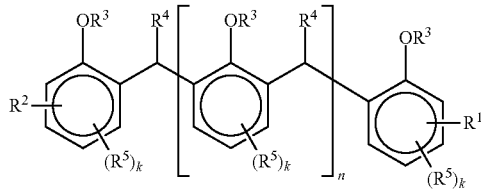

where
  $R^1$ is a branched alkyl or alkenyl radical which has from 10 to 40 carbon atoms and bears at least one carboxyl, carboxylate and/or ester group, which is bonded to the aromatic system via a secondary carbon atom of the alkyl or alkenyl chain,
  $R^2$ is hydrogen or $R^1$
  $R^3$ is hydrogen or an alkoxy group of the formula -(A-O)$_m$—H, A is a $C_2$- to $C_4$-alkylene group,
  m is from 1 to 100,
  $R^4$ is hydrogen, a $C_1$- to $C_{11}$-alkyl radical or a carboxyl group,
  $R^5$ is $C_1$-$C_{200}$-alkyl or -alkenyl, or O—$R^6$,
  $R^6$ is $C_1$-$C_{200}$-alkyl or -alkenyl,
  n is from 1 to 100 and
  k is 1 or 2
  wherein the oil comprises a crude oil or a product derived from crude oil and comprising a distillation residue.

* * * * *